United States Patent Office 3,304,190
Patented Feb. 14, 1967

---

3,304,190
PLASTICIZED PARTIALLY ESTERIFIED REGENERATED CELLULOSE FILM
Edward A. Wielicki, Philadelphia, Pa., and Anthony Labriola, Pennsville, N.J., assignors, by mesne assignments, to FMC Corporation, San Jose, Calif., a corporation of Delaware
No Drawing. Filed June 13, 1963, Ser. No. 287,506
5 Claims. (Cl. 106—189)

This invention relates to a partially esterified regenerated cellulose film plasticized with certain diol compounds.

Partially esterified regenerated cellulose film has improved dimensional stability and is relatively heat- and water-resistant compared to regenerated cellulose film per se. However, this type of film is quite brittle, and requires the incorporation of a suitable plasticizer to produce a packaging material having high durability.

It is an object of this invention to provide a partially esterified regenerated cellulose film containing a highly effective plasticizer.

It is another object of this invention to provide a partially acetylated regenerated cellulose film containing a highly effective plasticizer.

It is a further object of this invention to provide a partially esterified regenerated cellulose film having incorporated therein a plasticizer which is more effective than conventional cellulose ester plasticizers in equivalent amounts.

These and other objects are obtained in accordance with this invention which comprises a partially esterified regenerated cellulose film having incorporated therein, in a plasticizing amount, a diol selected from the group consisting of diethylene glycol, dipropylene glycol, triethylene glycol, 1,3-propanediol, 1,4-butanediol, 1,5-pentanediol, 2-methyl-2,4,-pentanediol and polyethylene glycol having an average molecular weight ranging from 200 to 600.

The preferred partially esterified regenerated cellulose film of this inveniton is one in which regenerated cellulose film has been partially esterified to obtain a lower fatty acid ester derivative of the cellulose film having an average degree of substitution between about 0.2 and 2.8 ester groups per anhydroglucose unit of of the cellulose molecule.

The partially esterified base film of this invention is prepared by running a wet gel or rewet unplasticized regenerated cellulose film, preferably about 1 mil thick or less, through one or more activation baths. From the activation bath the film is run through one or more catalyst baths and then advanced through an esterifying bath. Preferably, for acetylated film, the activation bath is glacial acetic acid and the esterifying bath is a mixture of acetic anhydride and acetic acid. Perchloric acid is a conventional catalyst and is employed at low concentration in acetic acid for the catalyst bath. After acetylation the film is passed through a catalyst inactivation bath, water wash bath, and finally the plasticization bath.

The plasticizers of this invention are preferably applied by treating the film in a solution of the plasticizer in acetone at room temperature and then drying the film. The plasticizer may also be applied from a water solution, in which case the partially esterified film should not be dried between the esterification step and the plasticization step. In general, in application of plasticizers from a water solution, less plasticizer is found in the film than when acetone is used as the solvent medium.

The concentration of the plasticizer in the liquid carrier medium ranges from about 1 to about 50% by weight. The amount of plasticizer which remains in the film after treatment depends on the residence time of the acetylated film in the bath. In general, amounts of from about 5 to 20% based on the weight of the film are preferred for incorporation therein.

The plasticized films may be coated with compositions containing film-forming resins to further modify the film properties. Examples of film-forming coating materials include nitro-cellulose, vinylidene halide copolymers, vinyl halide copolymers, polyolefins, acrylic polymers and copolymers, etc. These coating compositions may be applied to the base sheet by organic solvent, aqueous dispersion or melt extrusion techniques.

To demonstrate the highly effective nature of the plasticizers of this invention for partially esterified regenerated cellulose film a table is set forth below.

The acetylated regenerated cellulose film of the following table was a film of about 1.3 mil in thickness having a degree of substitution of about 2.3 acetyl groups per anhydroglucose unit of the cellulose molecule. The test films were each treated for equal lengths of time in the plasticizer bath. The "lead-shot bag test," the results of which are reported below, consists of forming a 5 in. by 5 in. square test film into a bag containing 100 grams of No. 8 lead shot. The neck of the bag is sealed with film adhesive tape and the bag is then placed in a steel beaker which is secured in a laboratory shaker. The time in seconds is measured from start of the shaker to the appearance of the first lead shot in the beaker. Five tests are made for each film to obtain an average value.

TABLE I.—PLASTICIZERS FOR PARTIALLY ACETYLATED REGENERATED CELLULOSE FILM

| Plasticizer | Percent Concentration in Acetone | Lead-shot Bag Value, sec. |
|---|---|---|
| Unplasticized film | | 2 |
| Mixture of o- and p-toluene ethylsulfonamide | 10 | 7 |
| Butyl benzyl phthalate | 10 | 7 |
| Diacetyl dibutyl tartrate | 10 | 13 |
| 1,3-butylene glycol | 10 | 13 |
| Ethyl phthalyl ethyl glycollate | 10 | 14 |
| Methyl phthalyl ethyl glycollate | 10 | 19 |
| 1,2,6-Hexanetriol | 10 | 16 |
| 2,-methyl-2,4-pentanediol | 10 | 25 |
| Dipropylene glycol | 10 | 27 |
| Diethylene glycol | 10 | 28 |
| 1,5-Pentanediol | 10 | 30 |
| Polyglycol 400 | 10 | 31 |
| 1,4-Butanediol | 10 | 32 |
| 1,3-Propanediol | 10 | 37 |
| 1,3-Propanediol | 20 | 53 |
| Triethylene glycol | 10 | 37 |

While plasticizers which are normally used for the plasticization of secondary cellulose acetate film, for example, the dialkyl tartrates, dialkyl phthalates, diaryl phosphates, triacetin, butyl benzoyl benzoate, butyl benzyl phthalate, alkyl-p-toluene sulfonamide, alkyl phthalyl alkyl glycollates, etc.; also plasticize partially acetylated cellulose film, more effective plasticization is brought about by the use of the plasticizers of this invention. The data set fourth in the above table show a consistently higher test rating for plasticizers of this invention. The "lead-shot bag value" for each is 25 or above while conventional commercially available plasticizers for cellulose acetate film had "values" of 19 and below.

Various changes and modifications may be made practicing the invention without departing from the spirit and scope thereof and, therefore, the invention is not to be limited except as defined in the appended claims.

We claim:
1. A partially esterfied regenerated cellulose film having incorporated therein, in a plasticizing amount, a compound selected from the group consisting of diethylene glycol, dipropylene glycol, triethylene glycol, 1,3-propanediol, 1,4-butanediol, 1,5-pentanediol, 2-methyl-

2,4-pentanediol and polyethylene glycol having an average molecular weight ranging from 200 to 600.

2. The partially esterified regenerated cellulose film of claim 1 wherein the film is a partially acetylated regenerated cellulose film having an average degree of substitution between about 0.2 and 2.8 acetyl groups per anhydroglucose unit of the cellulose molecule.

3. The partially esterfied regenerated cellulose film of claim 1 wherein the incorporated compound is present in the film in an amount ranging from about 5 to 20% based on the weight of the film.

4. The partially acetylated regenerated cellulose film of claim 2 having incorporated therein from about 5 to about 20% based on the weight of the film of 1,3-propanediol.

5. The partially acetylated regenerated cellulose film of claim 2 having incorporated therein from about 5 to 20% based on the weight of the film of triethylene glycol.

References Cited by the Examiner

UNITED STATES PATENTS

| | | | |
|---|---|---|---|
| 2,095,129 | 10/1937 | Drew | 106—164 |
| 2,917,397 | 12/1959 | Wilcox | 106—164 XR |
| 3,081,145 | 3/1963 | Ernst et al. | 106—189 XR |
| 3,109,743 | 11/1963 | Fleck et al. | 106—196 |
| 3,168,409 | 2/1965 | Wellisch | 106—189 XR |
| 3,204,017 | 4/1965 | Kawamura | 264—195 XR |

ALEXANDER H. BRODMERKEL, *Primary Examiner.*

J. H. WOO, *Assistant Examiner.*